DATA COLLECTING AND RECORDING DEVICE

Filed Aug. 26, 1963 3 Sheets-Sheet 1

INVENTORS
John M. Duncan,
William C. Sprague, &
John C. Decker
BY
Paul J. Etherington
ATTORNEY INVENTORS
John M. Duncan,
William L. Sprague &
John L. Decker
BY
Paul J. Ethington
ATTORNEY

DATA COLLECTING AND RECORDING DEVICE

Filed Aug. 26, 1963

3 Sheets-Sheet 3

INVENTORS
John M. Duncan,
William L. Sprague &
BY John L. Decker

Paul J. Etkington
ATTORNEY

United States Patent Office 3,303,471
Patented Feb. 7, 1967

3,303,471

DATA COLLECTING AND RECORDING DEVICE

John M. Duncan, Birmingham, William L. Sprague, Royal Oak, and John L. Decker, Pontiac, Mich., assignors to General Motors Corporation, Detroit, Mich., a corporation of Delaware Filed Aug. 26, 1963, Ser. No. 304,368
8 Claims. (Cl. 340—172.5)

This invention relates to data collecting and recording apparatus and, more particularly, to a device for measuring and recording, in a systematic fashion, data relating to the time duration of regularly and/or spuriously occurring events.

There are many instances where it is desirable to monitor an overall procedure by timing and recording the acts or events which make up the procedure. One such instance is in work studies where comprehensive data concerning the time required to perform various industrial movements is sought in order to more efficiently organize the movements and/or eliminate those movements which impair the overall efficiency of the procedure. Recording processes such as just outlined may be accomplished in a crude fashion by visual observation and timing of events with a stop watch followed by writing down the elapsed time for any single event with an accompanying event identification marking. However, where the events occur with sufficient rapidity and continuity, such a process is impracticable and inefficient.

The present invention provides an electronic data accumulating device which is adapted to be easily transported to a desired observation point for rapid and accurate collecting of work study data. Briefly described, the invention includes a clock or time measuring system including a source of timing signals, and a first storage means connected to receive the timing signals and to store a coded representation of the number of signals having occurred. The device further contemplates a second storage means for storing identification or classification information. Information may be loaded into the second storage means from a selectively operable input device such as a keyboard having a plurality of selectively closable switches for entering information into the storage means in a coded fashion. The first and second storage means may take the form of magnetic core registers as are well known in the art. The invention further includes data recording means such as a paper tape punch which is responsive to the flow of information from the storage means to make a permanent record of the collected data. In addition, control means link the timing signal storage means, the classification signal storage means and the recorder such that upon the occurrence of a predetermined command signal to the control means, information from both of the storage means is gated into the recorder.

More specifically, the classification signal input means may take the form of a portable keyboard having a plurality of keys which are grouped in accordance with predetermined classifications of information pertaining to the overall process and the sub-component events thereof to be monitored. To transfer the classification information into the storage means in a coded fashion, each of the keyboard keys is a selectively closable switch which is connected to an energizing source and also to a predetermined code combination of a plurality of signal lines which run to particular memory elements in the classification signal storage means.

A further feature of the invention is a provision for selectively interrupting the flow of timing information to the recorder such that identification or classification signals may be recorded exclusive of time information. This is accomplished by a mode memory component which may set the control means to be responsive to one of two available initiation signals such that only the classification storage means is gated into the recorder.

A further feature of the invention is a simplified method of synchronizing the information reading and recording operations to the clock system operation which eliminates the need for storing clock pulses during the reading and recording process. This is accomplished by means of a signal frequency division technique whereby the signals which program the control means occur intermediate the basic timing signals which advance the count in the timing signal storage means.

A still further feature of the invention is the provision for operating in several modes including a "time of day" mode, wherein the time information storage means is continually advanced throughout the data collecting process and an "elapsed time" mode in which the timing information storage is reset to zero each time the storage means are read out to the recorder. This is accomplished by means of a clock resetting means which may be selectively energized or deenergized in accordance with the mode desired.

A still further feature of the invention is the provision of an auxiliary storage means for keeping track of total elapsed time in a plurality of main categories independent from the permanent recording process.

The invention and the features briefly outlined above, as well as additional features, may be best understood by referring to the following specification which describes a specific embodiment of the invention. This specification is to be taken with the accompanying drawings of which:

FIGURE 3 is a block diagram of a specific embodiment of the invention;

Figure 1:
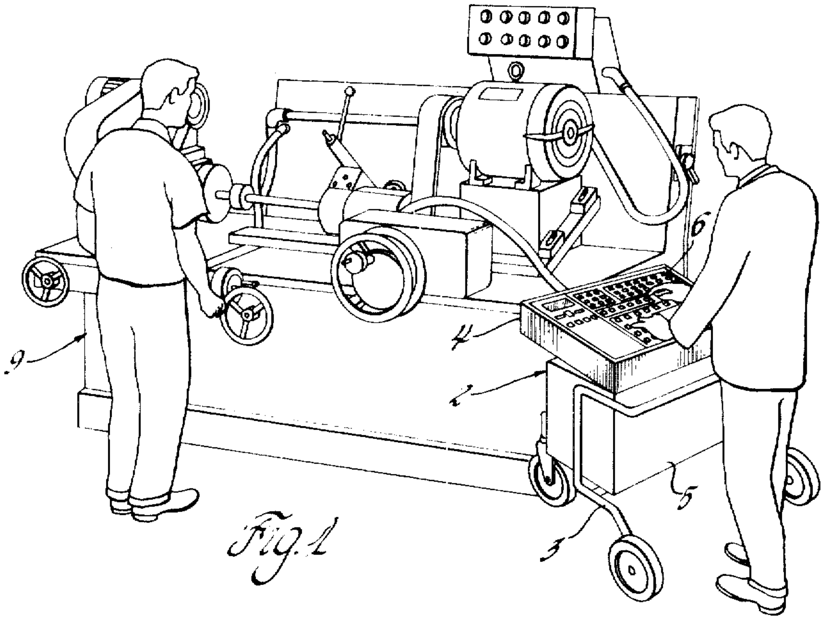
FIGURE 1 shows the invention being used to record work study data.
Figure 2:
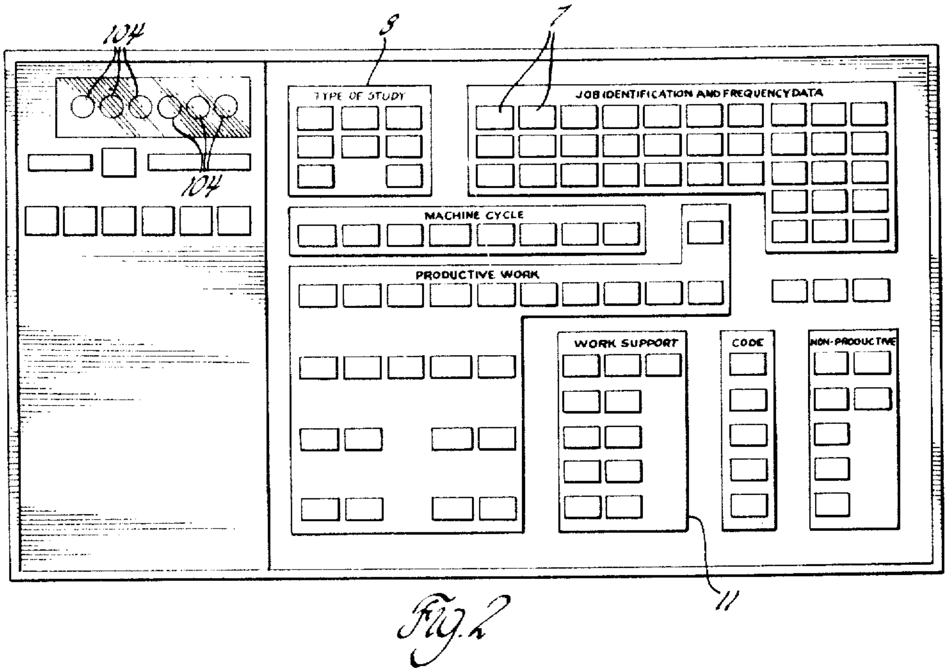
FIGURE 2 is an illustrative keyboard arrangement for entering coded work information into the classification storage means.

FIGURE 1 illustrates a typical use of the invention as embodied in a work data accumulator and recorder 2. The accumulator and recorder 2 is shown in use to record the time required by a worker to perform certain functions, some of which involve operation of a machine 9. As further shown in FIGURE 1, the accumulator and recorder 2 is mounted on a wheeled carriage 3 so as to be easily transported from one observation point to another. The carriage 3 carries an upper unit 4 and a lower unit 5 which package the various subcomponents of the device. The upper unit includes a keyboard 6 having a plurality of keys 7 which operates switches. The keys 7, as better seen in FIGURE 2, are grouped according to a code or scheme and are labeled in accordance with specific man and machine operations. As will be further described in detail, the upper unit also includes a logic assembly having an electronic clock which maintains a coded representation of time. In addition, the upper unit 4 houses storage means, into which information is loaded by means of the keyboard 6, and control means to link the clock and storage means with the lower unit 5, which contains the recorder. In this particular embodiment the recorder takes the form of a paper tape punch and means to program the punching and tape transport operations. Inasmuch as the embodiment of FIGURE 1 is portable, the lower unit 5 also includes a power supply.

To utilize the invention as depicted in FIGURE 1, the operator has placed the wheeled carriage 3 carrying the data accumulator and recorder in a convenient position for observing and recording the operations performed by a machine 9 and a worker who is operating the machine 9. To acquire and record data pertaining to actions performed by both the operator and the machine 9, the operator depresses the properly labeled key on the keyboard 6 at the time the worker or the machine or both change from one operation to the next. This enters classification information into the storage means according to a fixed code. The control means subsequently reads out the information loaded into the storage means along with timing information from the clock for transmission to the recorder. The recorder is responsive to the contents of the clock and the storage means to enter coded information signals onto a paper tape which makes a permanent record of the information. This paper tape may be further processed by a computer which forms no part of the present invention.

As shown in FIGURE 2, the keyboard 6 is laid out into groups of keys such as groups 8 and 11. As indicated, those keys in group 8 are used to enter information relating to "Type of Study." This information may be used to identify the tape or record prior to actual recording of work study information. Thus, depression of the keys in group 8 enters only classification information into the record. However, those keys in group 11, for example, are used to enter "work support" data, and as such are effective when depressed, to enter both classification and timing information into the record. As further shown in FIGURES 1 and 2, the face of the upper unit 4 may display other information as, for example, elapsed time from the clock by means of visual readout devices 104. The particular layout of the keyboard may be designed to suit the particular operation required.

FIGURE 3 is a block diagram of the accumulating and recording device shown in FIGURE 1 which, in accordance with the present invention, may be employed to collect and make a permanent record of data relating to the times required to perform various work functions. Time information is provided by a clock 10 which includes a source of primary signals in the form of a crystal oscillator 12. In the present embodiment, the oscillator 12 provides signals at a constant frequency of 1,600 c.p.s. The output of the oscillator 12 is connected into a first frequency divider 14. The frequency divider 14 comprises a magnetic core shift register 16 and a shift or advance driver 18. Both the register 16 and the driver 18 may be obtained from the Systems Components Division of AMP Incorporated, Harrisburg, Pennsylvania. In the present instance, the magnetic register 16 and the driver 18 are responsive to sixteen input signals from the oscillator 12 to provide one output signal. Thus, a serial input, serial output is contemplated. This divider 14 is connected through two subsequent frequency dividers 20 and 22 which may also include magnetic core shift registers and advance drivers. Each of the shift registers in the frequency dividers 20 and 22 is responsive to six input signals to provide a carry which is connected into the next advance driver. A simple calculation shows that the free frequency divisions of the 1,600 c.p.s. crystal oscillator 12 provides an output from divider 22 of signal pulses which occur at the rate of 10,000 per hour. This particular frequency division and, therefore, clock rate allows time to be kept in continental decimal units.

The output of frequency divider 22 is transmitted to a storage means consisting of a series of cascaded magnetic core registers 24, 26, 28, 30, 32 and 34, each of which has associated therewith an advance driver. Other than the number of input signals required to produce an output, the clock registers 24, 26, 28, 30, 32 and 34 are all similar to the frequency dividers 14, 20 and 22. In accordance with the desire to keep time in decimal units, the registers 24, 26, 28, 30, 32 and 34 are adapted to produce one output signal upon receiving ten input signals. Thus, the contents of the shift registers correspond to individual digits of a decimal representation of elapsed time, the most significant digit being represented by the contents of register 34 and the least significant digit being represented by the contents of register 24. Although any number of registers may be used, the present number allows time signals to be accumulated up to 99.9999 hours.

Classification information is entered into the system from a keyboard designated by reference character 6, which corresponds to FIGURES 1 and 2. The keyboard, 6 as previously described, comprises an array of pushbutton keys 7 which may be manually operated by a work observer to enter coded classification information into a plurality of storage registers 38, 40 and 42. The registers 38, 40 and 42 may also be, for example, magnetic core storage registers adapted for parallel input and output. All of the registers 24, 26, 28, 30, 32, 34, 38, 40 and 42 are connected via respective output lines to a main trunk line 44 which is connected into a recorder 46. The recorder 46 includes a binary coded decimal storage buffer 50 which is effective to prepare the information from the storage registers for application to a punch driver assembly 52. The punch driver assembly 52 may be a solenoid operated unit which drives a conventional paper tape punch 54 such as type TP100 of the Invac Corporation of Waltham, Massachusetts.

To control the flow of information from the storage registers 24, 26, 28, 30, 32, 34, 38, 40 and 42, a control center 48 is provided. The control center is connected to each of the storage registers via a plurality of multi-conductor input-output lines 54, 56, 58, 60, 62, 64, 66, 68 and 70. In accordance with signals generated in the control center 48, the storage registers are sampled in a sequential fashion to gate information from the registers into the recorder 46.

To perform the readout or sampling operations of the storage registers, the cycle control center 48 includes a main shifting register 72 which is programmed by the clock 10 to perform certain operations at predetermined times within a clock cycle. To accomplish this synchronization, shift register 72 is interconnected with the output of frequency divider 22 by a line 74 to receive an input signal every 1/10,000 of an hour. A second input line 76 to the shift register 72 is connected to the output of the frequency divider 20. Thus, six pulses are provided on input line 76 for every pulse on input line 74. Signals on each of the lines 74 and 76 initiate respective actions in the shift register 72. Additionally, shift register 72 is interconnected with the keyboard 6 via a multiple conductor line 61 which is energized after each of the keys 7 is depressed to initiate the operation of the control center 48. The input-output lines 54, 56, 58, 60, 62 and 64 are connected to a plurality of sampling drivers 78, 80, 82, 84, 86, 88, the outputs of which are respectively connected into the shift registers 24, 26, 28, 30, 32 and 34. Upon the occurrence of a command signal from keyboard 6 via line 61 and a synchronization signal from clock 10 on one of the lines 74 and 76, shift register 72 sequentially energizes the input-output lines 54, 56, 58, 60, 62 and 64 to read information out of the associated shift registers 24, 26, 28, 30, 32 and 34, respectively, onto trunk line 44. This readout is done in a nondestructive fashion such that the time information in the clock 10 is not destroyed with the reading but may continue to accumulate if this mode of operation is chosen.

The input-output lines 66, 68 and 70 are interconnected with respective sampling drivers 96, 98 and 100. The drivers 96, 98 and 100 are respectively connected to the classification signal storage registers 38, 40 and 42. Thus, sequential energization of the lines 66, 68 and 70 is effective to gate the information out of the registers 38, 40, 42 and into the recorder 46 where a permanent record thereof is made. This readout operation may be performed separately from or along with the readout of timing information from clock 10. The registers 38, 40, 42 may be destructively read out since new classification information is entered into the registers each time the keyboard 6 is operated.

For manually setting each of the registers of the clock 10 to any desired digit in accordance with the present time of day or other desired time reference, a plurality of signal input channels collectively designated at 102 are provided. Each of the individual channels 102 is connected via one of a plurality of output lines collectively designated at 103, to respective shift registers in the clock 10. To provide a visual clock readout a plurality of "Nixie" elements collectively designated at 104 are connected via trunk line 105 to the auxiliary outputs 106, 107, 108, 109, 110 and 111 of shift registers 24, 26, 28, 30, 32 and 34, respectively.

The recording process requires sampling the registers of the clock 10. This cannot be done when a clock signal is being propagated through the clock 10. The readout operation may be accomplished by re-routing clock pulses into a temporaray storage means during readout. However, a much simpler technique is employed in the present invention. This technique involves programming recorder operations between consecutive clock times. To accomplish this, signal lines 112, 114 and 116 are connected from frequency divider 20 to separate sections indicated at 118, 119 and 120 in the BCD storage buffer 50. These three lines 112, 114 and 116 are sequentially energized by frequency divider 20 at sub-intervals of clock times to program recording operations. With the use of a paper tape punch, the signal lines 112, 114 and 116 represent control signal lines for tape punch, retract and transport operations, respectively. Each of the lines 112, 114 and 116 are connected to respective sections 118, 119 and 120 of the storage buffer 50. All of the sections of the buffer 50 are also connected via a line 77 to an RF voltage source 75 which supplies high frequency current for the readout operation. This high frequency signal is required to energize the punch driver solenoids and is converted to D.C. by a representative diode 51 which is connected between buffer 50 and driver 52.

The invention as shown in FIGURE 3 may be operated in a plurality of modes including a "time of day" mode and an "elapsed time" mode. In the "time of day" mode, the registers 24, 26, 28, 30, 32 and 34 are continually advanced by clock pulses over an entire data accumulating and recording session. Thus, the time information which is entered into the recorder 46 will represent the time of day or total elapsed time from a preset reference point and time intervals may be calculated by subtracting one time code from the subsequent time code on the tape. In the "elapsed time" mode all of the clock registers 24, 26, 28, 30, 32 and 34 are reset to zero whenever timing information is read out from the registers. Accordingly, the time information which accompanies the classification information into the recorder 46 represents, without necessity of subtraction, the time elapsed between two successive operations of the keyboard 6.

The implementation of this mode control may be accomplished by means of a clock reset source 158 which is interconnected via input line 160 with the shift register 72 to be energized thereby. The clock reset source 158 is connected via output line 162 with the advance driver of each of the registers 24, 26, 28, 30, 32 and 34. To select whichever of the two modes is desired the keyboard 6 is connected with a mode memory control 168 by means of conductor 166. The output of the mode memory control 168 is connected by means of line 169 to the shift register 72.

When the operator desires to use the "elapsed time" mode, the mode memory control 168 is set by means of a particular key on the keyboard 6 to condition the shift register 72 such that each time a particular conductor in line 61 is energized a circuit will be completed to the clock reset source 158 through line 160. Thus, each time a key or group of keys is depressed to enter information into the registers 38, 40 and 42, line 61 sets up shift register 72 such that upon sampling of the last of the registers 24, 26, 28, 30, 32 and 34 to be sampled, a pulse is delivered through line 160 to the clock reset source 158. This pulse triggers source 158 to deliver an output signal on line 162 which resets all of the clock registers to zero. Since the classification storage registers 38, 40 and 42 are wire for destructive readout, no reset means is required for these registers.

When a "time of day" mode of operation is desired, the proper key on the keyboard 6 is depressed to energize mode memory control 168 oppositely to that previously described. The mode memory control 168 then conditions shift register 72 to break the circuit to line 160. Accordingly, the last sampling operation produces no pulse on line 160 and the clock continues to run up to its maximum reading of 99.9999 hours, at which time turnover is automatic.

Figure 4:
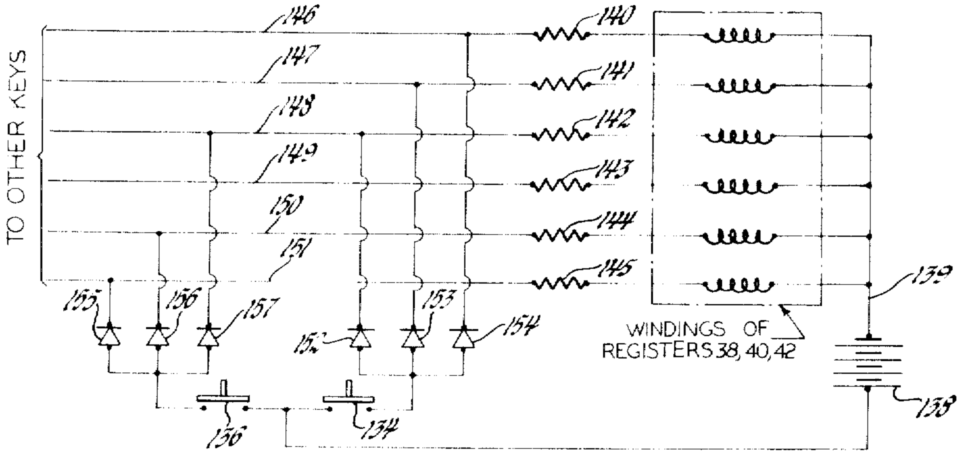
FIGURE 4 is a schematic diagram illustrating apparatus for providing coded input information from the keyboard to the classification storage means.
Figure 5:
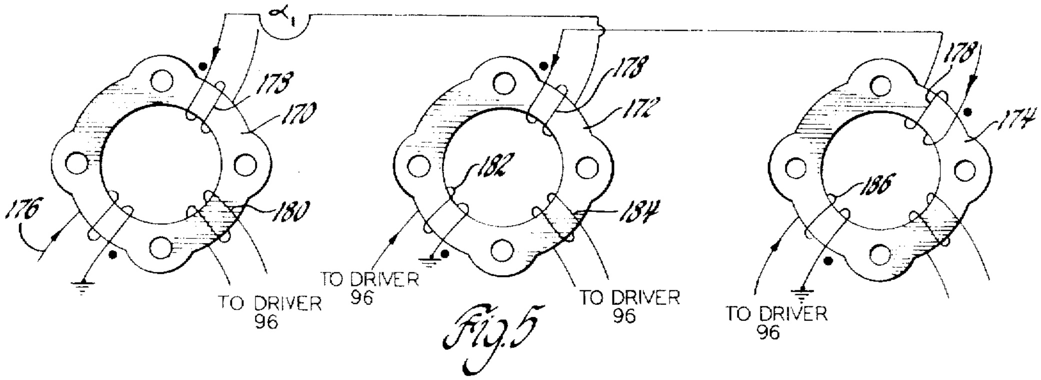

Reference to FIGURE 4 shows schematically how a coded connection between the keyboard switches and the registers 38, 40 and 42 may be accomplished. FIGURE 4 includes two key switches 134, 136 in the form of single-pole, single-throw switches. One side of each of the switches 134, 136 is commonly connected to the positive terminal of a voltage source 138. The negative terminal of the voltage source is connected via line 139 to the windings of registers 38, 40, 42, and to a plurality of current limiting resistors 140, 141, 142, 143, 144, 145. Each of the resistors 141–145 is respectively connected to one of a plurality of single lines 146, 147, 148, 149, 150, 151. In the present instance six signal lines 146, 147, 148, 149, 150, 151 are shown connecting the keys with the storage registers 38, 40 and 42. However, it is to be understood that for increased coding capability, more than six signal lines may be used; for example, in one embodiment of the present invention, 22 signal lines are used giving a possibility of $2^{22}$ possible combinations. Each of the key switches 134 and 136 is connected into a predetermined coded combination of the signal lines 146 through 151. This is accomplished, for example, with respect to key switch 134, through three diodes 152, 153 and 154 which are, in turn, connected to signal lines 148, 147 and 146. Accordingly, closure of key switch 134 energizes only lines 146, 147 and 148. Since the signal lines 146 through 151 are connected to combinations of cores in the registers 38, 40 and 42, energization of the combination 146, 147 and 148 will be interpreted by the registers as a particular key switch. Similarly, key switch 136 is connected through three diodes 155, 156 and 157 to signal lines 151, 150 and 148. Closure of switch 136 energizes only lines 151, 150 and 148. The registers 38, 40 and 42 thus interpret this coded combination of energized signal lines as representing the number or letter from key 136. Through the use of this coding technique, it can be seen that all of the signal lines may be carried in a single multi-conductor trunk line past each of the keyboard switches where the predetermined diode code connection may be made. This combination requires only single-pole, single-throw switches and a single voltage source.

Figure 5:
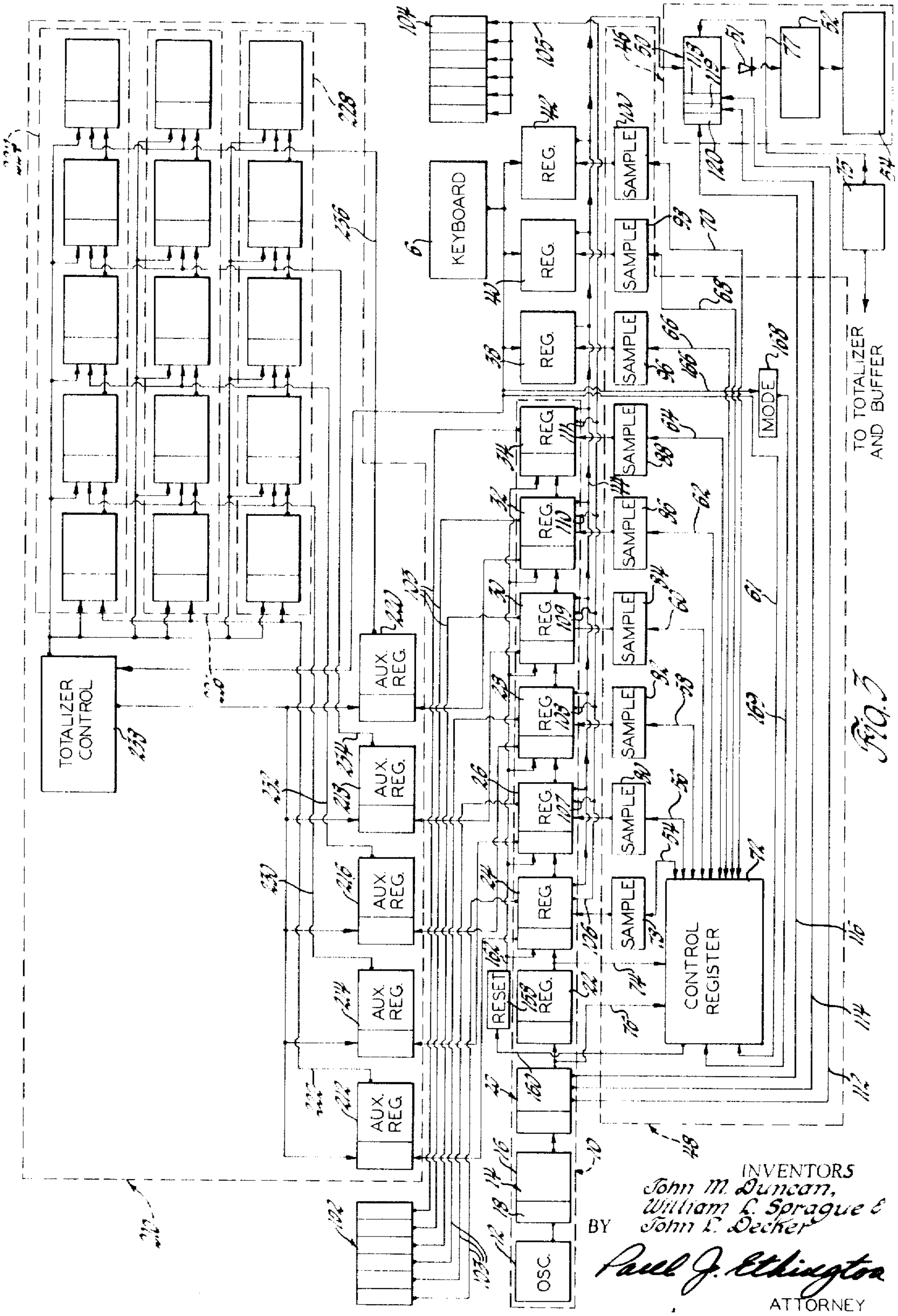
FIGURE 5 is a schematic diagram showing a representative portion of a particular form of control means which may be used in the present invention.
Figure 6:
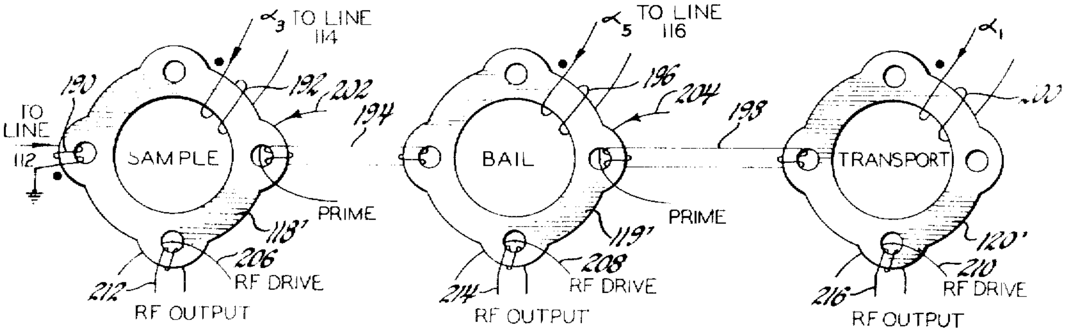
FIGURE 6 is a schematic diagram showing a representative portion of the information transfer logic associated with the recorder.

The invention may be best understood by describing a typical sequence of operations, making reference to the schematic diagrams of FIGURES 5 and 6. As previously stated, the storage registers 24, 26, 28, 30, 32, 34, 38, 40 and 42, as well as registers 72, may be of the magnetic core type employing a plurality of ferromagnetic memory cores as indicated in FIGURE 5. The cores may take the form of multi-aperture discs, commonly known as MAD elements. These elements exhibit a substantially square hysteresis characteristic and, thus, may be saturated in two directions by current pulses on appropriate windings. The two saturated conditions may be termed "set" and "cleared" for purposes of discussion. Since the cores of the registers are interdependently wound, the shifting operation is begun at a point in the register determined by the setting of an initial core. As will be apparent to those skilled in the art, this initial core may be selected at any point in the core sequence to omit or include as many cores as is desired.

Assuming the paper tape to be properly threaded through the tape transport system, the operator may first wish to identify the job type and number. In doing so, predetermined keyboard switches are operated to enter only alphabetical or alpha-numeric information into registers 38, 40 and 42. These keyboard switches may, for example, be those of group 8 shown in FIGURE 2. Depression of these keys energizes a particular conductor in line 61 to condition the shift register 72 to sample only registers 38, 40 and 42 since no time information is required. The signal on line 61 sets a particular initialization core in register 72 which instructs the cycle control 48 where to begin the sampling operation.

Referring to FIGURE 5, a representative portion of the interior of register 72 is shown to comprise a series of magnetic cores 170, 172 and 174. It is to be understood that more cores are used than are shown in FIGURE 5. Operation of the particular keyboard switches associated with group 8 on the keyboard 6 sets core 170 by gating a current pulse through an input winding 176 which is connected with a conductor in line 61. In accordance with the dot convention used in FIGURES 5 and 6, it will be assumed that current entering the dot side of a winding clears the associated core. Thus, a current pulse on line 176 in the direction shown sets core 170, saturating it in a counterclockwise direction. Upon the occurrence of a clock derived pulse $\alpha_1$ on a winding 178 which is common to all of the cores 170, 172 and 174, core 170 is cleared, causing a voltage pulse of predetermined polarity to be generated in an output winding 180. The pulse on line 178 has no effect on cores 172 and 174 since they were not set. The clock derived pulse $\alpha_1$ may be obtained, for example, from line 76 which provides initialization signals for the mode in which only registers 38, 40 and 42 are sampled. The signal on winding 180 is transmitted via input-output line 66 to sampling driver 96. This pulse fires driver 96 to read out the contents of register 38. Firing of driver 96 also produces a signal which is transmitted via input-output line 66 to an input winding 182 associated with core 172. This signal sets core 172. The occurrence of the next clock derived pulse $\alpha_1$ on the common winding 178 clears core 172, producing a signal in an output winding 184 which is transmitted via input-output line 68 to driver 98, thus, reading out register 40. Firing of driver 98 generates a signal which is transmitted to input winding 186 to set core 174. The next clock derived pulse $\alpha_1$ reads out register 42 in a similar fashion. Thus, separate cores in register 72 control the readout operation in a sequential fashion. A similar set of cores can be used to read out the clock registers.

As previously stated, each of the sampling or readout operations as described with reference to registers 38, 40 and 42, requires several operations in the recorder 46. These operations are programmed by the clock derived signals $\alpha_1$, $\alpha_3$ and $\alpha_5$ (see FIGURE 7) which appear on lines 112, 114 and 116, respectively. A detailed description of these operations may be made with reference to the representative core arrangement of FIGURE 6.

Figure 7:
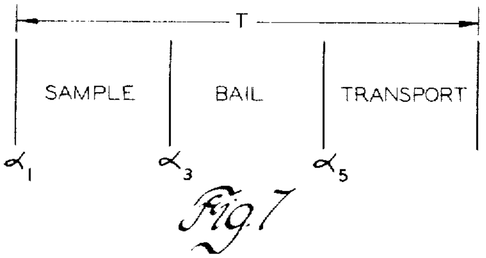
FIGURE 7 is a timing chart illustrating the time relationship between various signals employed in the circuit diagram of FIGURE 6.

FIGURE 6 shows three cores 118', 119' and 120' which correspond to the similarly numbered sections of buffer 50. Upon clearing of any of the cores in register 72, such as 170, 172 or 174 in FIGURE 5, by the $\alpha_1$ signal on line 76, a signal also appears on line 112. This signal is transmitted to an input winding 190 which links a minor aperture of core 118' This signal $\alpha_1$ sets core 118'. The simultaneously occurring sample operation of one of the storage registers gates the information contained in the particular register sampled into the storage buffer 50. With core 118' properly set, this register information is converted into RF signals which energize the driver 52 and punch the tape. At the end of the sample time, a clock derived signal $\alpha_3$ is generated on line 114. This line 114 is connected to a clear winding 192 which clears core 118' and produces a pulse in a line 194 which links minor apertures of cores 118' and 119'. The pulse in line 194 sets core 119' and retracts or "bails" the tape punches. At the end of the bail time, a clock derived signal $\alpha_5$ is produced on line 116 which clears core 119' via winding 196 and sets core 120' via a line 198 which is common to minor apertures of cores 119' and 120'. Setting of core 120' initiates the tape transport operation which is later terminated by $\alpha_1$ which clears core 120' via winding 200. Cores 118' and 119' are provided with "prime" windings 202 and 204 respectively linking minor apertures. These windings are required to provide an output pulse when the core is cleared. The core arrangement of FIGURE 7 is felt to be well known to those skilled in the art and is described in greater detail in a publication by Amp Incorporated, entitled, "Care and Feeding of Amp-Mad Shift Registers," copyrighted 1960, 1962.

As previously suggested the RF source 75 is connected to the buffer cores by means of RF drive windings 206, 208 and 210. The output to the tape punch system is provided on RF output windings 212, 214 and 216, respectively.

It can be seen that the three recording operations occur intermediate successive pulses on line 76. Thus, between each clock derived signal $\alpha_1$ and each stepping of cores 170, 172, 174 of shift register 72, the three required recording operations take place. It may further be seen that in the interval between two consecutive clock pulses from divider 22 appearing on line 74, eighteen operations may be performed. This is, of course, due to the factor of six frequency divisions performed by divider 22. Thus, when time information is to be recorded from registers 24, 26, 28, 30, 32 and 34, all six clock registers can be read between two consecutive clock pulses without the need for means to store clock pulses during the readout operation.

With the tape properly addressed and identified, the collection of work event data and timing data may be begun. This is initiated by setting the clock 10 to the desired reading by means of the manual set means 102. Time information is then fed into the sequence of registers 24, 26, 28, 30, 32 and 34, from the oscillator 12 and the frequency dividers 14, 20 and 22. At the proper time, determined by the observations of the operator, a classification signal is entered into the storage registers 38, 40 and 42 from the keyboard 6. This signal may be entered by depressing a key in group 11, for example. Upon entering a classification signal into the registers via the coding arrangement of FIGURE 4, the cycle control center 48 receives a signal via line 61 which instructs the readout cycle to begin. However, in this instance, since time information is required to accompany the classification information into the recorder 46, all of the registers 24, 26, 28, 30, 32, 34, 38, 40 and 42 must be sampled. Thus, the particular keys on keyboard 6 must energize a conductor in line 61 which conditions the register 72 to be responsive to a signal on line 74 to sample all registers.

This process is begun in a manner similar to that described above by setting a first core in the shift register 72 from the signal on line 61. The register 72 is then responsive to the clock derived signal on line 74 to energize input-output line 64 which fires sampling driver 94. This gates the most significant digit of time into the recorder 46 and also resets the register 72 in preparation for the next clock derived signal as was described in detail above. Accordingly, the registers 24, 26, 28, 30, 32 and 34 are sampled in sequence, beginning with the highest order digit register 34, by a core switching operation as was described with reference to FIGURE 5. Between each sampling, the three recording processes are programmed by the core arrangement of FIGURE 6.

The above description of the operation relates generally to both the "time of day" and the "elapsed time" modes of operation. In addition, operation in the "elapsed time" mode entails an operation by which the clock is reset to zero by means of the clock reset source 158 each time the least significant time digit is read out from register 24. When operating in the "elapsed time" mode it is often desirable to keep track of the total elapsed time in a number of broad word categories such as "Productive," "Non-Productive" and "Work Support." To accomplish this totalizing technique, a totalizer generally indicated at 210 is provided. The totalizer 210 includes a bank of auxiliary registers 212, 214, 216, 218 and 220. The auxiliary registers 212, 214, 216, 218 and 220 are equipped with advance drivers and are, in fact, like the driver and register combinations 24, 26, 28, 30, 32 and 34. As indicated in FIGURE 3 the advance driver of register 24 is connected to the advance driver of register 212 and so forth. The output of magnetic register 212 is connected by an output line 222 to the input of each of three cascaded banks of registers 224, 226 and 228. The output of register 214 is connected via line 230 to the input of the second register in the register banks 224, 226 and 228. Similarly, the output of the registers 216, 218 and 220 are connected via respective output lines 232, 234 and 236 to the third, fourth and fifth registers in the register banks 184, 186 and 188, respectively. In addition, a totalizer control 238 is provided which may take the form of a counting or shifting register having an output line connected to each of the registers in the register banks 224, 226 and 228.

Briefly, the operation of the totalizer is as follows. After sampling of the registers 24, 26, 28, 30, 32 and 34 is accomplished in a non-destructive fashion, the content of each of these registers is advanced quickly to zero by connecting the clock source 12 into the registers. This may be accomplished by a switch or keyboard key selection which is omitted for simplicity. At the same time, the advance driver of each of the registers 24, 26, 28, 30, 32 and 34 is effectively disabled from advancing the subsequent register. While each of the registers is counted forward to zero, the advance driver is, however, effective to send counting pulses to the advance drivers of the registers 212, 214, 216, 218 and 220. Thus, the number appearing in the registers 212, 214, 216, 218 and 220 will correspond to the ten's complement of the digit in the individual registers 24, 26, 28, 30, 32 and 34. At this time the clock oscillator 12 is connected into each of the registers 212, 214, 216, 218 and 220 to quickly count these registers forward to zero. Thus, the number of digits in the registers 212, 214, 216, 218 and 220 are recomplemented and the original numbers of digits appearing in the timing or clock registers 24, 26, 28, 30, 32 and 34 are read into the register banks 224, 226 and 228 in accordance with whichever of the register banks correspond with the keyboard group from which the depressed key was selected. The RF source 75 may be connected with the register banks 224, 226 and 228 to provide visual readout by means of the readout devices 104. A keyboard button may be provided for the purpose of reading each of the accumulator banks 224, 226 and 228. The accumulator device may, of course, be operated without the totalizer, since it is in no way connected into the recorder 46.

It is to be understood that the invention has been described with reference to a particular embodiment thereof, and that various modifications and substitutions will be apparent to those skilled in the art and may be made without departing from the scope and spirit of the invention. For a definition of the invention, reference should be made to the appended claims.

What is claimed is:

1. Data collection and classification apparatus comprising: clock means for producing signals at a plurality of selected frequencies, the clock means including first storage means connected to receive one of said selected frequencies and to store a coded representation thereof; selectively operable means for providing a plurality of classification signals; second storage means connected to receive and to store a coded representation of the classification signals; recording means connected to the first and second storage means for making a permanent record of the contents thereof; control means having output means and operable to produce a plurality of output signals in response to input command signals; means connecting the selectively operable means to the control means to provide first command signals which condition the control means for operation; means connecting clock signals at another of said selected frequencies to the control means to provide second command signals which operate the control means; and means connecting the output means of the control means to the first and second storage means to gate the contents thereof into the recording means.

2. Data collection and classification apparatus comprising: a source of timing signals, first storage means connected to receive the timing signals and to store a coded representation of the number of signals having occurred, classification signal input means including a keyboard having a plurality of selectively closable switches, a voltage source, a plurality of signal lines commonly connected to one terminal of the voltage source, the other terminal of the voltage source being connected to one side of each of the switches, diode means connecting the other sides of each of the switches to predetermined coded combinations of the signal lines whereby closure of a switch energizes a coded combination of the lines, the coded combinations representing respective classification signals, second storage means connected to the plurality of signal lines for storing the respective classification signals, recording means connected to the first and second storage means for making permanent records of the contents thereof, control means connected to the first and second storage means and responsive to command signals to gate the contents of the storage means into the recorder; and means to produce command signals at times corresponding to the times of operation of the classification signal input means, said command signal means being connected to the control means.

3. Data collection and classification apparatus comprising: clock means for providing signals at a plurality of selected frequencies; first storage means including a cascaded bank of registers connected to receive first signals at a first of said selected frequencies and to store a coded representation of the number of said first signals having occurred; selectively operable input means for providing a plurality of classification signals; second storage means connected to receive and to store the classification signals; recorder means connected to the first and second storage means and adapted to make a permanent record of the contents thereof; control means having a plurality of inputs and outputs; sampling means connecting the outputs to the first and second storage means; the control means having a first input connected to the input means and responsive to the operation thereof to condition the control means for operation, and a second input connected to the clock means for receiving second signals at a second of said selected frequencies to sequentially energize the plurality of outputs; the second frequency being a multiple of the first frequency whereby the outputs are energized between successive first signals; the sampling means being responsive to the energization of the outputs to transfer the information in the storage means to the recorder means.

4. Apparatus as defined in claim 3, the combination further including reset means having an input connected to the control means and an output connected to the first storage means, said reset means being responsive to signals from the control means to reset the registers of the first storage means to a reference condition after each transfer of information from the storage means to the recorder means.

5. Apparatus as defined in claim 3 including means connecting clock signals occurring at a third of the selected frequencies to the recorder means to program the operations thereof, the third frequency being a multiple of the second frequency whereby the recorder operations are programmed between successive energizations of the outputs.

6. Apparatus as defined in claim 3 wherein the selectively operable input means including a keyboard having a plurality of depressable keys for providing classification signals, the first input of the control means being responsive to depression of a predetermined group of the keys to condition the control means to energize only those outputs connected to the registers of the second storage means.

7. Apparatus for obtaining and recording data related to the time required to perform a plurality of industrial activities and comprising: input means for producing signals representative of the plurality of industrial activities; first storage means connected to receive said signals and to store a coded representation thereof; clock means including a source of timing signals and a second storage means connected to receive the signals and to store a coded representation thereof; recorder means responsive to the coded representations to produce a permanent record thereof; selectively energizable means connecting the first and second storage means and the recorder means and control means having first and second inputs and a plurality of outputs, the outputs being connected to the selectively energizable means; the input means being connected to the first input of the control means and the source being connected to the second input, the control means being responsive to the signals from the input means to transfer the contents of the first and second storage means to the recorder means at a rate related to the frequency of said timing signals.

8. Apparatus as defined by claim 7 wherein the input means comprises a keyboard having a plurality of selectively operable keys, the keys being divided into groups which are representative of various classifications of industrial activities.

References Cited by the Examiner

UNITED STATES PATENTS

| | | | |
|---|---|---|---|
| 2,883,255 | 4/1959 | Anderson | 340—172.5 X |
| 2,987,704 | 6/1961 | Gimpel et al. | 340—172.5 |
| 2,993,195 | 7/1961 | Groce | 340—172.5 |
| 3,024,991 | 3/1962 | Foote | 235—156 |
| 3,147,370 | 9/1964 | Lowman | 235—151 |

ROBERT C. BAILEY, *Primary Examiner.*

P. J. HENON, *Assistant Examiner.*